Patented June 15, 1926.

1,588,728

UNITED STATES PATENT OFFICE.

ADOLPH HERSCOVITCH, OF MONTREAL, QUEBEC, CANADA.

PROCESS OF MAKING ARTIFICIAL STONE.

No Drawing. Application filed September 14, 1925. Serial No. 56,400.

The invention relates to a process of making artificial stone and the objects of the invention are to produce a hard, non-porous and durable material, that will be particularly useful in building operations for interior and exterior work as well as of great service in other industrial and ornamental arts; to furnish such material at a low price in a finished condition and therefore not requiring the work of the artisan in dressing; to eliminate the great waste of material due to the dressing and finishing of the natural stone; to facilitate the decoration of interiors and the fitting up and equipment of lavatories, bath rooms and other places; to economize in the consumption of the more expensive natural stones; to make a good substance for the porcelain and other insulating material used in the electrical trade; and to provide an efficient, inexpensive and serviceable material for the aforesaid or other purposes and it consists essentially of the treatment of well known substances used largely in the art of cement construction and in bringing these ingredients to a condition not heretofore known in the art as more particularly explained hereinafter and pointed out in the claim for novelty following the description.

It is necessary to form a solution by dissolving magnesium chloride MgC in water and bring the solution up to approximately 25 to 28 Baumé, thus forming the one part.

The other part is dry and is made up of magnesium oxide MgO or calcined magnesium in a pulverized state and marble dust, sand and fine ash combined or separately according to the purpose of the product thus forming the other main part to the mixture.

For one part of the solution, one to six parts of the powdered mixture are used, as much depends on the nature and use of the product.

These parts are poured separately and at the same time into a mixer having an agitator therein, which churns the solution and powder together until they are thoroughly commingled and brought to a thick creamy state for molding.

To make imitation marble a small quantity of the creamy substance is thoroughly mixed with a coloring matter and this is poured here and there on top of the main body of creamy substance and this is then poured on to a glass or other polished surface, such as duco, cellophin or celluloid until it fills up an enclosure laid on the glass or other surface.

The coloring which is on top of the mixture naturally streaks out first forming natural markings on the surface and slightly below of the finished product, being almost an exact imitation of the markings in real marble. The moisture drys out leaving a consistent slab of durable material beautifully marked and having a high polish on the surface against the glass or other polished surface. Where cellophin is used for the surface polish, the thin sheet crinkles and leaves innumerable recessed grain markings all polished and of extremely ornamental appearance.

These lines run regularly and in straight line and in parallel curves and the result is a most dressy surface to the imitation stone.

For some purposes it is desirable to add to the powder part of the mixture fine asbestos dust and so materially add to the heat resisting properties of the product or finely divided cord may be used for refrigerating walls.

To make other stones the mold members are differently arranged and constructed as also in the production of images, statuettes and other artistic designs for ornamentations and various uses in the home, the church and in building operations.

What I claim is:—

The herein described process of making artificial stone, comprising making a solution of magnesium chloride and water and mixing with a powdered mixture of magnesium oxide and mineral dust and laying said combination of parts on a cellophin surface thereby crinkling the smooth surface of said cellophin to form a corresponding surface on the finished piece.

Signed at Montreal, Canada, this 24th day of August, 1925.

A. HERSCOVITCH.